(12) United States Patent
Miyazawa

(10) Patent No.: US 9,001,340 B2
(45) Date of Patent: Apr. 7, 2015

(54) CONTROL DEVICE

(71) Applicant: Brother Kogyo Kabushiki Kaisha, Nagoya-shi, Aichi-ken (JP)

(72) Inventor: Masafumi Miyazawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 23 days.

(21) Appl. No.: 13/757,215

(22) Filed: Feb. 1, 2013

(65) Prior Publication Data
US 2013/0201509 A1    Aug. 8, 2013

(30) Foreign Application Priority Data
Feb. 3, 2012    (JP) ................................. 2012-022110

(51) Int. Cl.
*G06F 3/12* (2006.01)
*H04N 1/00* (2006.01)

(52) U.S. Cl.
CPC ....... *H04N 1/00962* (2013.01); *H04N 1/00244* (2013.01); *H04N 1/00925* (2013.01); *H04N 1/0097* (2013.01); *H04N 1/00973* (2013.01); *H04N 2201/0039* (2013.01); *H04N 2201/0094* (2013.01)

(58) Field of Classification Search
CPC .......... H01N 1/00244; H01N 1/00925; H01N 1/00962; H01N 1/0097; H01N 1/00973; H01N 2201/0039; H01N 2201/0094

USPC .................................. 358/1.1–1.9, 1.11–1.18
See application file for complete search history.

(56) References Cited

U.S. PATENT DOCUMENTS

| | | | | |
|---|---|---|---|---|
| 2003/0231337 | A1* | 12/2003 | Nishimura | 358/1.15 |
| 2006/0087669 | A1* | 4/2006 | Yamaguchi et al. | 358/1.13 |
| 2007/0115502 | A1 | 5/2007 | Sato | |
| 2011/0063668 | A1* | 3/2011 | Shirai | 358/1.15 |

FOREIGN PATENT DOCUMENTS

| | | | |
|---|---|---|---|
| JP | 2004-362486 | * | 1/2004 |
| JP | 2004-362486 A | | 12/2004 |
| JP | 2007-148580 A | | 6/2007 |

* cited by examiner

*Primary Examiner* — King Poon
*Assistant Examiner* — Ibrahim Siddo
(74) *Attorney, Agent, or Firm* — Merchant & Gould PC

(57) ABSTRACT

A control device, which is used for a system including a content server configured to store a plurality of contents and a plurality of printers, includes: a determination unit configured to, when a first instruction for printing a specific content of the plurality of contents is input into a specific printer of the plurality of printers, determine specific print setting relation information relating to a specific print setting that is recommendable for the specific printer to print the specific content in accordance with specific type relation information relating to a type of the specific printer and specific content relation information relating to the specific content; and a print control unit configured to control a print execution unit of the specific printer to print the specific content by using the specific print setting in accordance with the determined specific print setting relation information.

6 Claims, 10 Drawing Sheets

FIG. 4

RECOMMENDATION SETTING TABLE (76)

| MODEL NAME | SETTING ID | SETTING CONTENT |
|---|---|---|
| M10 | ID1 | IMAGE QUALITY: HIGH IMAGE QUALITY, SHEET: NORMAL SHEET, SIZE: POSTCARD |
| M10 | ID2 | IMAGE QUALITY: NORMAL IMAGE QUALITY, SHEET: NORMAL SHEET, SIZE: A4 |
| ... | ... | ... |
| M50 | ID1 | IMAGE QUALITY: SUPER HIGH IMAGE QUALITY, SHEET: GLOSS SHEET, SIZE: POSTCARD |
| M50 | ID2 | IMAGE QUALITY: NORMAL IMAGE QUALITY, SHEET: RECYCLED SHEET, SIZE: A4 |
| ... | ... | ... |

FIG. 5

CAPABILITY TABLE (78)

| MODEL NAME | CAPABILITY INFORMATION | | |
|---|---|---|---|
| M10 | IMAGE QUALITY: HIGH IMAGE QUALITY<br>NORMAL IMAGE QUALITY | SHEET: NORMAL SHEET | SIZE: POSTCARD<br>A4, B5 |
| M50 | IMAGE QUALITY: SUPER HIGH IMAGE QUALITY<br>HIGH IMAGE QUALITY<br>NORMAL IMAGE QUALITY | SHEET: GLOSS SHEET<br>NORMAL SHEET<br>RECYCLED SHEET | SIZE: POSTCARD<br>A4, B5<br>PHOTO L |
| ... | ... | | |

(C10 brackets the SIZE column)

FIG. 6

PROHIBITION SETTING TABLE (80)

| SETTING ID | PROHIBITION SETTING |
|---|---|
| ID1 | NO |
| ID2 | SIZE: POSTCARD |
| ... | ... |

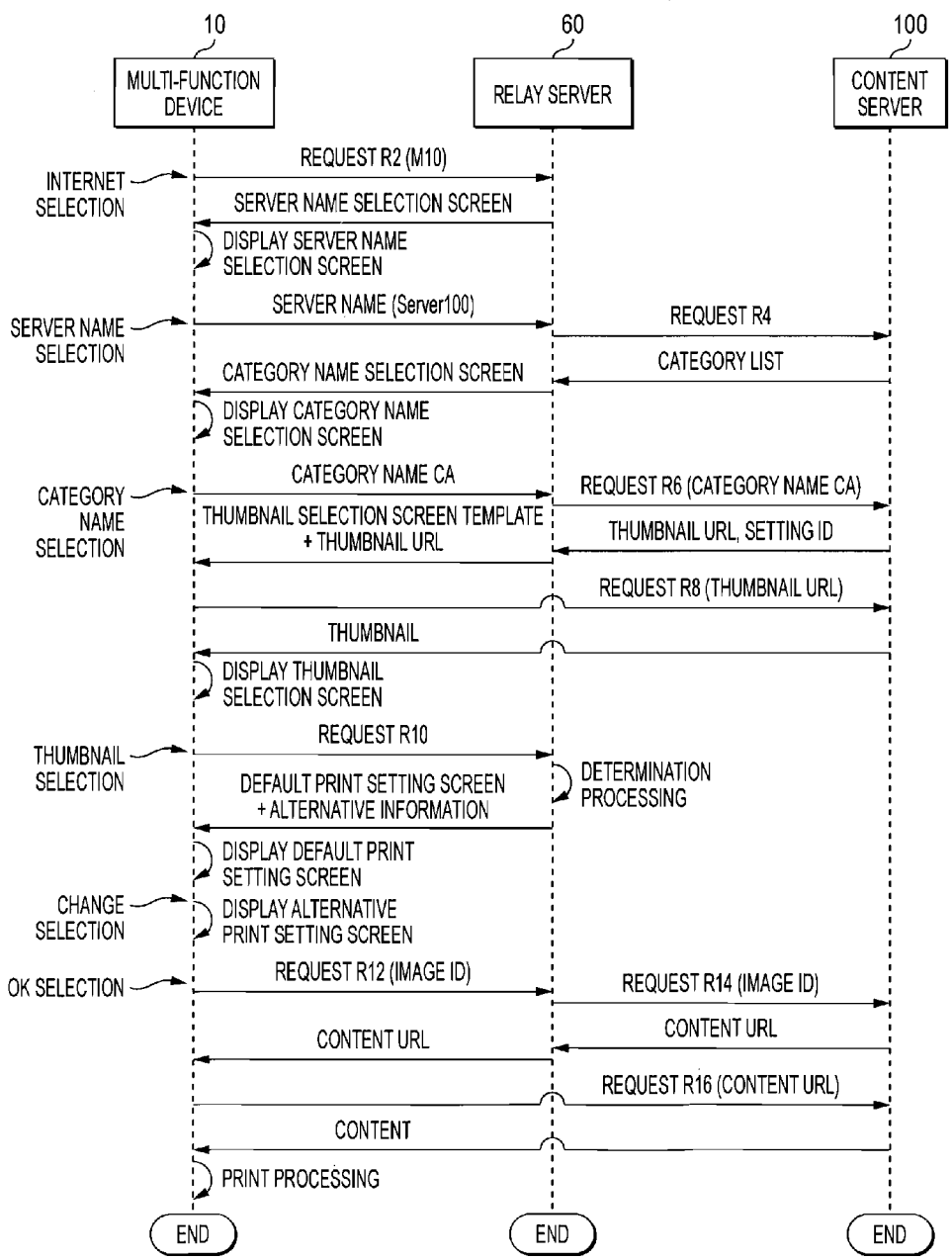

FIG. 9

(SECOND EXEMPLARY EMBODIMENT)

PRIORITY ORDER TABLE (82)

| SETTING ID | PRIORITY ORDER |
|---|---|
| ID1 | IMAGE QUALITY: SUPER HIGH IMAGE QUALITY > HIGH IMAGE QUALITY > NORMAL IMAGE QUALITY<br>SHEET: GLOSS SHEET > NORMAL SHEET > RECYCLED SHEET<br>SIZE: POSTCARD > B5 > A4 > PHOTO L |
| ID2 | IMAGE QUALITY: NORMAL IMAGE QUALITY > HIGH IMAGE QUALITY > SUPER HIGH IMAGE QUALITY<br>SHEET: RECYCLED SHEET > NORMAL SHEET > GLOSS SHEET<br>SIZE: A4 > B5 > PHOTO L > POSTCARD |
| ... | ... |

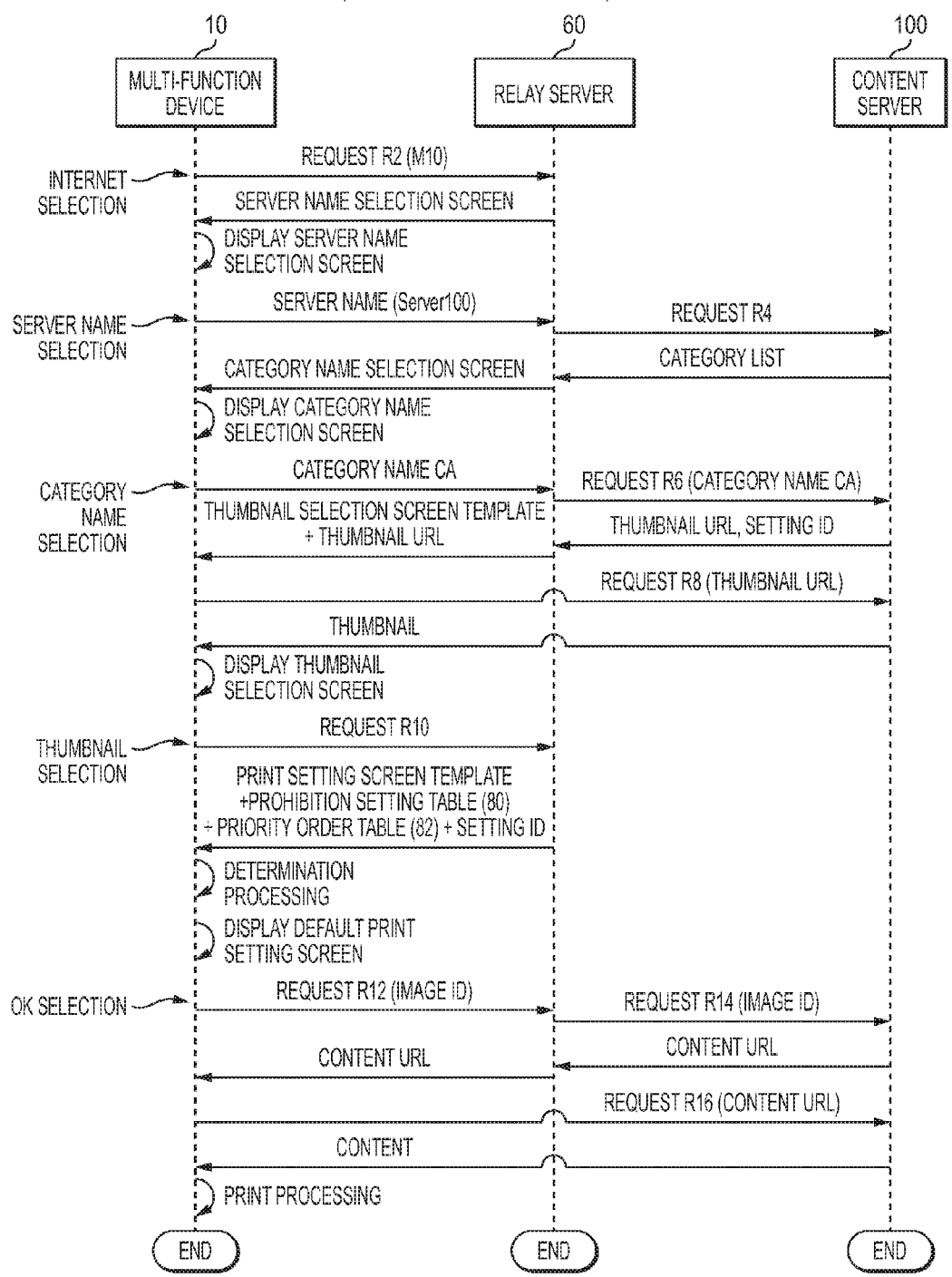

FIG. 11

(FOURTH EXEMPLARY EMBODIMENT)

CONTENT SERVER 100 → STORE ONLY CONTENT OF GREETING CARD
CONTENT SERVER 110 → STORE ONLY CONTENT OF LESSON

RECOMMENDATION SETTING TABLE (76)

| MODEL NAME | SERVER NAME | SETTING CONTENT |
|---|---|---|
| M10 | Server100 | IMAGE QUALITY: HIGH IMAGE QUALITY, SHEET: NORMAL SHEET, SIZE: POSTCARD |
| M10 | Server110 | IMAGE QUALITY: NORMAL IMAGE QUALITY, SHEET: NORMAL SHEET, SIZE: A4 |
| ... | ... | ... |
| M50 | Server100 | IMAGE QUALITY: SUPER HIGH IMAGE QUALITY, SHEET: GLOSS SHEET, SIZE: POSTCARD |
| M50 | Server110 | IMAGE QUALITY: NORMAL IMAGE QUALITY, SHEET: RECYCLED SHEET, SIZE: A4 |
| ... | ... | ... |

FIG. 12

(FIFTH EXEMPLARY EMBODIMENT)

CONTENT TABLE (106)

| CONTENT NAME | SETTING ID |
|---|---|
| CHRISTMAS CARD | ID100 |
| NEW YEAR'S CARD | ID101 |
| HALLOWEEN | ID102 |
| ⋮ | ⋮ |

CONTROL DEVICE

CROSS-REFERENCE TO RELATED APPLICATIONS

This application claims priority from Japanese Patent Application No. 2012-022110 filed on Feb. 3, 2012, the entire subject matter of which is incorporated herein by reference.

TECHNICAL FIELD

The invention relates to a control device that is used for a system having a content server and a plurality of printers downloading and printing contents from the content server.

BACKGROUND

There have been disclosed a system for outputting document information stored in a server on the Internet. In this system, when an image forming apparatus provided in a printing shop is unable to perform a printing by using the same print setting as a print setting that has been designated by a user upon a binding of the first edition, the image forming apparatus proposes an alternative print setting relating to an output function of the image forming apparatus to the user.

SUMMARY

Illustrative aspects of the invention provide a technology for executing a printing by using an appropriate print setting.

According to one illustrative aspect of the invention, there is provided a control device configured to be used for a system that comprises a content server configured to store a plurality of contents and a plurality of printers configured to download and print contents from the content server. The control device comprises a determination unit and a print control unit. The determination unit is configured to, when a first instruction for printing a specific content of the plurality of contents is input into a specific printer of the plurality of printers, determine specific print setting relation information relating to a specific print setting that is recommendable for the specific printer to print the specific content in accordance with specific type relation information relating to a type of the specific printer and specific content relation information relating to the specific content. The print control unit is configured to control a print execution unit of the specific printer to print the specific content by using the specific print setting in accordance with the determined specific print setting relation information.

BRIEF DESCRIPTION OF THE DRAWINGS

FIG. 4 shows an example of a recommendation setting table;
FIG. 5 shows an example of a capability table;
FIG. 6 shows an example of a prohibition setting table;
FIG. 7 is a sequence view of each processing that is executed by each device;
FIG. 9 shows an example of a priority order table of a second exemplary embodiment;
FIG. 10 is a sequence view of each processing that is executed by each device of a third exemplary embodiment;
FIG. 11 shows an example of a recommendation setting table of a fourth exemplary embodiment;
and
FIG. 12 shows an example of a content table of a fifth exemplary embodiment.

DETAILED DESCRIPTION

<General Overview>

Figure 1:
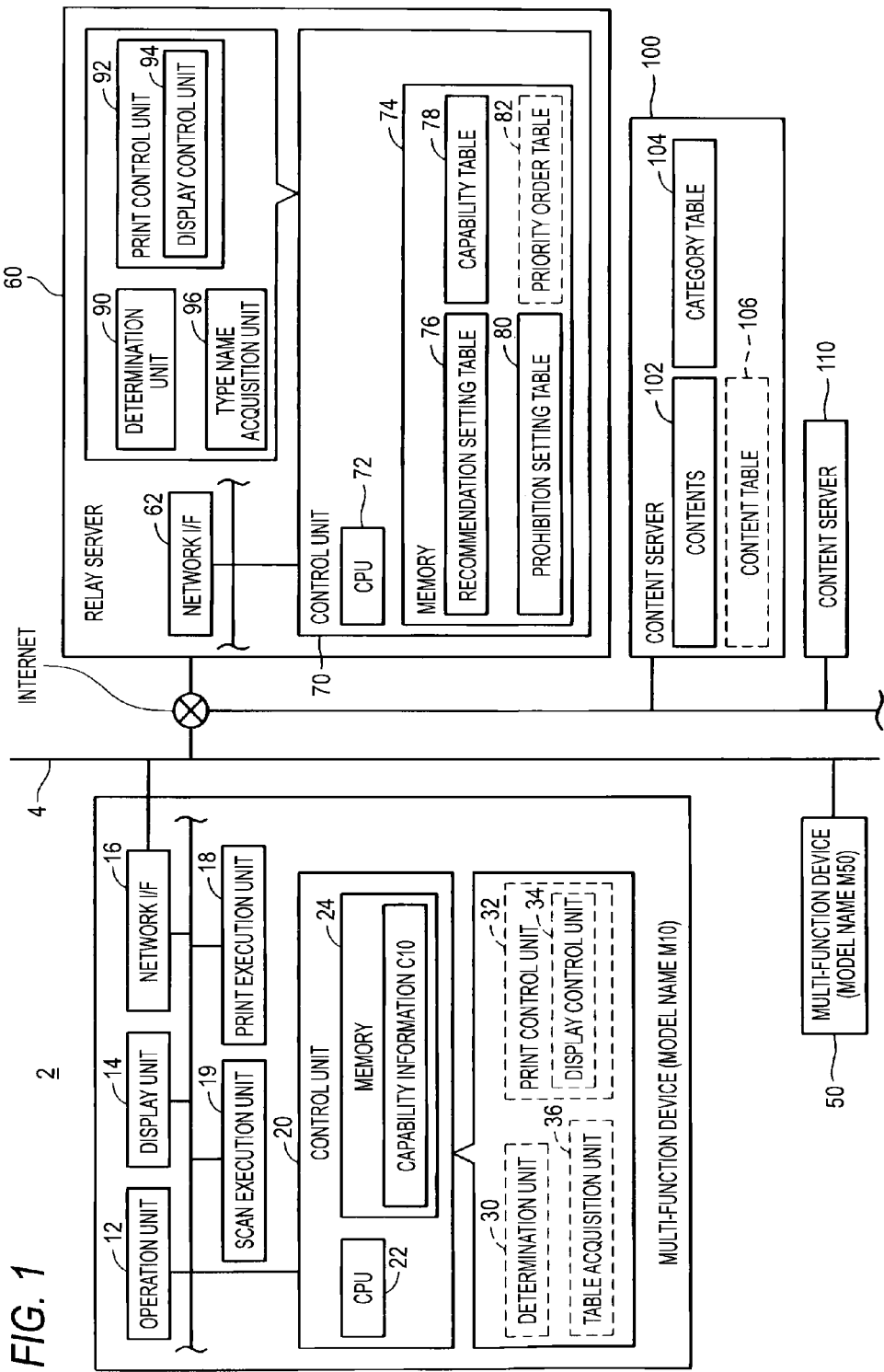
FIG. 1 shows a configuration of a communication system.

Illustrative aspects of the invention provide a technology for executing a printing by using an appropriate print setting.

According to a first illustrative aspect of the invention, there is provided a control device configured to be used for a system that comprises a content server configured to store a plurality of contents and a plurality of printers configured to download and print contents from the content server. The control device comprises a determination unit and a print control unit. The determination unit is configured to, when a first instruction for printing a specific content of the plurality of contents is input into a specific printer of the plurality of printers, determine specific print setting relation information relating to a specific print setting that is recommendable for the specific printer to print the specific content in accordance with specific type relation information relating to a type of the specific printer and specific content relation information relating to the specific content. The print control unit is configured to control a print execution unit of the specific printer to print the specific content by using the specific print setting in accordance with the determined specific print setting relation information.

According to the above configuration, when determining the specific print setting relation information, the control device uses at least two types of the information including the specific type relation information and the specific content relation information. Therefore, the control device can determine the appropriate print setting relation information (e.g., the specific print setting relation information). Hence, the control device can enable the print execution unit to print the specific content by using the appropriate print setting (e.g., the specific print setting).

According to a second illustrative aspect of the invention, the print control unit may comprise a display control unit configured to display the specific print setting on a display unit of the specific printer in accordance with the determined specific print setting relation information. The specific print setting relation information may be the specific print setting. The determination unit may be further configured to determine an alternative print setting that is different from the specific print setting from a plurality of print settings that the specific printer is able to use. The display control unit may be configured to display the determined alternative print setting on the display unit when a second instruction for displaying the alternative print setting is input into the specific printer.

According to this configuration, the control device can display the specific print setting on the display unit of the specific printer. Thus, a user of the specific printer can select the specific print setting, so that the control device can enable the print execution unit to print the specific content by using the specific print setting. Further, when the second instruction is input into the specific printer, the control device can display the alternative print setting on the display unit of the specific printer. Therefore, the control device can provide the user with the alternative print setting.

According to a third illustrative aspect of the invention, the determination unit may be configured to determine the alternative print setting by using a prohibition setting table. The prohibition setting table may be a table in which content relation information relating to content and a prohibition setting are associated with each other, the prohibition setting being a print setting that is prohibited from being used for printing the corresponding content. The determination unit may be configured to determine the alternative print setting that is different from a specific prohibition setting associated with the specific content relation information in the prohibition setting table.

According to this configuration, the control device can display the alternative print setting that is different from the specific prohibition setting on the display unit of the specific printer. Therefore, the control device can provide the user with the alternative print setting.

According to a fourth illustrative aspect of the invention, the control device may be a control server that is independently configured from the content server and the plurality of printers. The control device may further comprise: a memory configured to store a recommendation setting table, in which type relation information indicating a type name of a printer, content relation information relating to content and print setting relation information are associated with one another, the print setting relation information relating to a print setting that is recommendable for the corresponding printer to print the corresponding content; and a type name acquisition unit configured to acquire the specific type relation information indicating a type name of the specific printer from the specific printer. The determination unit may be configured to determine the specific print setting relation information that is associated with the specific type relation information and the specific content relation information in the recommendation setting table.

According to this configuration, the control device (e.g., control server) can appropriately determine the specific print setting relation information by using the recommendation setting table.

According to a fifth illustrative aspect of the invention, the specific print setting relation information may be the specific print setting. The determination unit may be configured to determine the specific print setting relation information by using a priority order table. The priority order table may be a table in which content relation information relating to content and a priority order of a print setting recommendable for printing the corresponding content are associated with each other. The specific type relation information may be a plurality of print settings that the specific printer is able to use. The determination unit may be configured to determine, from the plurality of print settings, the specific print setting having the highest priority order indicated by a specific priority order that is associated with the specific content relation information in the priority order relation table.

According to this configuration, the control device can appropriately determine the specific print setting by using the priority order table.

According to a sixth illustrative aspect of the invention, the control device may be a control server that is independently configured from the content server and the plurality of printers. The control device may further comprise: a memory configured to store a capability table and the priority order table; and a type name acquisition unit configured to acquire a type name of the specific printer from the specific printer. The capability table may be a table in which a type name of a printer and type relation information are associated with each other, the type relation information being a plurality of print settings that the corresponding printer is able to use. The determination unit may be configured to determine the specific print setting having the highest priority order indicated by the specific priority order from the plurality of print settings associated with a type name of the specific printer in the capability table.

According to this configuration, the control device (e.g., control server) can appropriately determine the specific print setting relation information by using the capability table and the priority order table.

According to a seventh illustrative aspect of the invention, the control device may be a controller that is mounted in the specific printer. The control device may also comprise a table acquisition unit configured to acquire the priority order table from a control server that is separately configured from the content server and the plurality of printers.

According to this configuration, the control device (e.g., control server) can appropriately determine the specific print setting relation information by using the priority order table that is acquired from the specific server.

According to an eighth illustrative aspect of the invention, the plurality of contents may be classified into two or more groups. Content relation information may be allotted to each of the two or more groups. The specific content relation information may be content relation information allotted to a specific group comprising the specific content.

According to a ninth illustrative aspect of the invention, the plurality of contents may be classified into the two or more groups based on categories to which the plurality of contents belong, respectively.

Further, a content server may be configured by two or more servers distributedly storing the plurality of contents. The plurality of contents may be classified into the two or more groups based on servers to which each of the plurality of contents belongs. Further, content relation information may be allotted to each of the plurality of contents. The specific content relation information may be content relation information that is allotted to the specific content.

A control method for implementing the above control device, a computer program and a computer-readable recording medium storing therein the computer program are also novel and useful.

Exemplary Embodiments

Exemplary embodiments of the invention will now be described with reference to the drawings.

First Exemplary Embodiment

Configuration of System

As shown in FIG. 1, a communication system 2 includes a plurality of multi-function devices 10, 50, a relay server 60 and a plurality of content servers 100, 110. The respective multi-function devices 10, 50 are connected to a LAN 4. The relay server 60 and the respective content servers 100, 110 are connected to the Internet 6.

(Configuration of Multi-Function Device 10)

The multi-function device 10 is configured to execute multi-functions such as printing, scan, copy and FAX functions. The multi-function device 10 has a model name 'M10.' The multi-function device 10 includes an operation unit 12, a display unit 14, a network interface 16, a print execution unit 18, a scan execution unit 19 and a control unit 20. The operation unit 12 includes a plurality of keys. A user can input a variety of instructions into the multi-function device 10 by operating the operation unit 12. The display unit 14 is a display for displaying a variety of information. The network interface 16 is connected to the LAN 4. The print execution unit 18 includes a print mechanism such as inkjet and laser methods and the like. The scan execution unit 19 includes a scan mechanism such as CCD, CIS and the like.

The control unit 20 includes a CPU 22 and a memory 24. The CPU 22 is configured to execute a variety of processing in response to programs stored in the memory 24. The CPU 22 is configured to execute the processing in response to the programs and to implement functions of a determination unit 30, a print control unit 32 and a table acquisition unit 36. The print control unit 32 includes a display control unit 34. Incidentally, the respective units 30 to 36 are used in a third exemplary embodiment, which will be described later.

The memory 24 stores therein capability information C10 in addition to the programs. The capability information C10 is information including a plurality of print settings that the multi-function device 10 is able to use. Specifically, the multi-function device 10 can execute a printing of a high image quality (e.g., relatively high print resolution) and a printing of a normal image quality (e.g., relatively low print resolution). The multi-function device 10 can execute the printing only with a normal sheet. Further, the multi-function device 10 can execute the printing on printing sheets of postcard, A4 and B5 sizes, etc. Therefore, the multi-function device 10 has two types of settings (high and normal image qualities) as the print image quality, one type of a setting (normal sheet) as the sheet type, and three types of settings (postcard, A4 and B5) as the sheet size. Hence, the multi-function device 10 is able to use a total of six print settings (2×1×3). That is, the capability information C10 is the information including the six print settings.

Incidentally, the multi-function device 50 is also configured to execute the multi-functions such as print and scan functions. In this exemplary embodiment, a vendor of the multi-function device 50 is the same as that of the multi-function device 10. However, the multi-function device 50 has a model name 'M50' that is different from the multi-function device 10. Therefore, the capability information of the multi-function device 50 is different from the capability information C10 of the multi-function device 10.

(Configuration of Relay Server 60)

The relay server 60 is a server that is independently provided from the multi-function devices 10, 50 and the content servers 100, 110. The relay server 60 is a server for relaying provision of contents from the content server 100, 110 to the multi-function devices 10, 50. The relay server 60 is a server that is provided by the vendor of the multi-function devices 10, 50. The relay server 60 includes a network interface 62 and a control unit 70. The control unit 70 includes a CPU 72 and a memory 74. The CPU 72 executes a variety of processing in response to programs stored in the memory 74. The CPU 72 executes the processing in response to the programs, so that functions of a determination unit 90, a print control unit 92 and a type name acquisition unit 96 are implemented. The print control unit 92 includes a display control unit 94.

Incidentally, the memory 74 stores therein a recommendation setting table 76, a capability table 78 and a prohibition setting table 80 in addition to the above programs. The respective tables 76, 78, 80 will be described later. Incidentally, a priority order table 82 is used in a second exemplary embodiment, which will be described later.

(Configuration of Content Servers 100, 110)

The content server 100 is a server that is provided by the vendor of the multi-function devices 10, 50. The content server 100 stores therein a plurality of contents 102 and a category table 104. Incidentally, a content table 106 is used in a fifth exemplary embodiment, which will be described later.

Figures 2, 3:
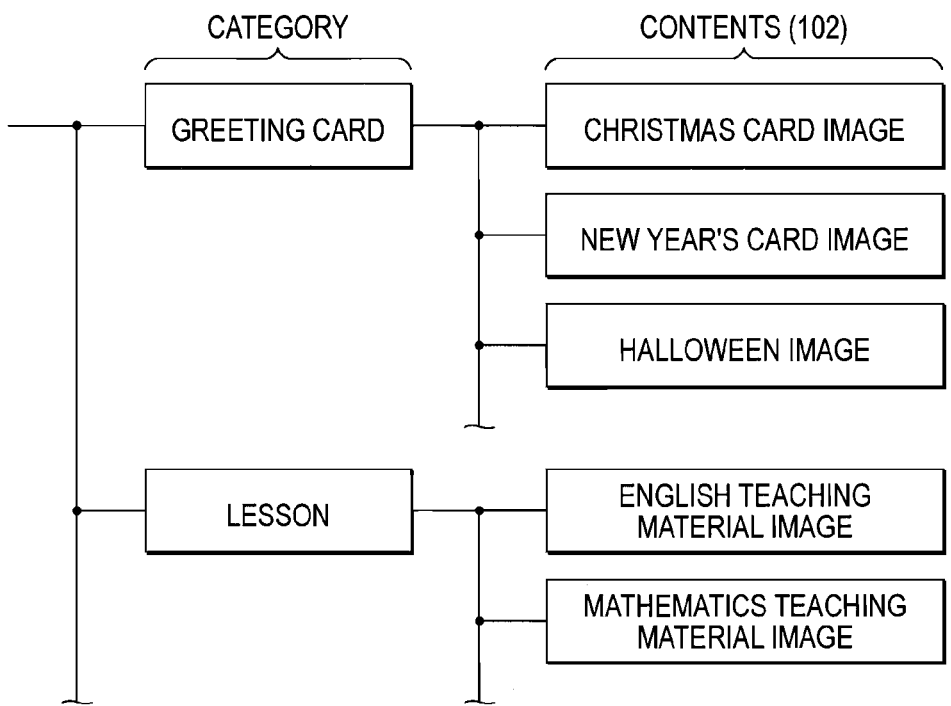
FIG. 2 shows an example of a plurality of contents.
FIG. 3 shows an example of a category table.

The vendor stores the plurality of contents 102, which the user of the multi-function devices 10, 50 are able to use, in advance in the content server 100. As shown in FIG. 2, the plurality of contents 102 is classified into two or more groups, based on categories. For example, a category 'greeting card' includes a contents group relating to a variety of greeting cards such as Christmas card, New Year's card and the like. Further, a category 'Lesson' includes a content group relating to a variety of lessons such as English teaching material, mathematics teaching material and the like.

The vendor further stores the category table 104 in advance in the content server 100. As shown in FIG. 3, the category table 104 is a table in which a category name and a setting ID are associated with each other. The setting ID is an ID that the relay server 60 uses so as to determine a default print setting (e.g., recommendable print setting) (which will be described later) when the content belonging to a category associated with the corresponding setting ID is to be printed.

The content server 110 is not a server that is provided by the vendor of the multi-function devices 10, 50. The content server 110 may be a well-known content server such as 'Evernote (registered trademark)', 'Google (registered trademark) Docs', 'Picasa (registered trademark)' and 'facebook (registered trademark)'.

As described above, the content server 100 is provided by the vendor of the multi-function devices 10, 50, and the content server 110 is provided by a business operator that is different from the vendor. The vendor of the multi-function devices 10, 50 discloses a first API (Application Program Interface) for receiving contents from the content server 100, and the business operator discloses a second API for receiving contents from the content server 110. In general, the first API and the second API are different. A communication device is required to correspond to both the first and second APIs for receiving the contents from the respective content servers 100, 110 (e.g., both a program for using the first API and a program for using the second API are required).

In order for the multi-function devices 10, 50 to receive the contents from the plurality of content servers 100, 110, respectively, the multi-function devices 10, 50 are required to correspond to a plurality of APIs and thus store therein a plurality of programs. However, compared to a PC and the like, storage capacities of the memories of the multi-function devices 10, 50 are smaller. Therefore, in this exemplary embodiment, the relay server 60 is provided so that the multi-function devices 10, 50 can receive the contents from the respective content servers 100, 110 without storing many programs in the multi-function devices 10, 50. That is, the relay server 60 corresponds to a plurality of APIs for the plurality of content servers 100, 110. In a situation where the multi-function devices 10, 50 are to receive the contents from a specific content server (for example, content server 100) of the plurality of content servers 100, 110, the relay server 60 uses an API for the specific content server to thus perform a variety of communications (for example, communications of respective requests R4, R6, R14 and the like shown in FIG. 7) (which will be described later) with the specific content server. Thereby, even though the multi-function devices 10, 50 do not correspond to the API for the specific content server, the multi-function devices 10, 50 can download the contents from the specific content server.

(Contents of Tables 76, 78, 80)

As shown in FIG. 4, the recommendation setting table 76 is a table in which a model name, a setting ID and setting content are associated. The model name indicates model names of the multi-function devices 10, 50. The setting ID is the same as the setting ID of FIG. 3. The setting content indicates a print setting that is recommendable for the multi-function devices 10, 50.

As shown in FIG. 3, the category 'Greeting card' is allotted with a setting ID 'ID1.' A user typically wants a printing result of a high image quality so as to deliver a greeting card to another person. From this standpoint, in the recommendation setting table 76 of FIG. 4, an image quality associated with the model name 'M10' of the multi-function device 10 and the setting ID 'ID1' allotted to the category 'Greeting card' is a 'high image quality.' Incidentally, the multi-function device 50 can execute a printing with a super high image quality having a print resolution higher than the high image quality as well as with the high image quality and normal image quality. Therefore, in the recommendation setting table 76 of FIG. 4, an image quality associated with the model name 'M50' of the multi-function device 50 and the setting ID 'ID1' allotted to the category 'Greeting card' is a 'super high image quality.' Incidentally, since the multi-function device 10 is able to use only the normal sheet, a sheet associated with 'M10' and 'ID1' is a 'normal sheet.' Compared to this, since the multi-function device 50 is able to use a gloss sheet with which it is possible to execute a printing of the high image quality, compared to the normal sheet, a sheet associated with 'M50' and 'ID1' is a 'gloss sheet.' Further, it is preferable to print the greeting card on a print sheet having a postcard size. From this standpoint, a size associated with 'M10 (or M50)' and 'ID1' is 'postcard.'

Further, as shown in FIG. 3, the category 'Lesson' is allotted with a setting ID 'ID2.' Since a user does not show a teaching material of a lesson to the other person, the user typically does not want to acquire a print result of a high image quality. From this standpoint, in the recommendation setting table 76 of FIG. 4, an image quality associated with the model name 'M10 (or M50)' of the multi-function device 10 (or multi-function device 50) and the setting ID 'ID2' allotted to the category 'Lesson' is a 'normal image quality.' Since the multi-function device 10 is able to use only the normal sheet, the sheet associated with 'M10' and 'ID2' is a 'normal sheet.' Compared to this, since the multi-function device 50 is able to use a recycled sheet, a sheet associated with 'M50' and 'ID2' is a 'recycled sheet.' Also, a teaching material of a lesson is preferably printed on a print sheet of an A4 size that can be received in a general file. From this standpoint, a size associated with 'M10 (or 'M50')' and 'ID2' is 'A4.'

As shown in FIG. 5, the capability table 78 is a table in which a model name and capability information are associated with each other. The model name indicates model names of the multi-function devices 10, 50 and the like. The capability information indicates a plurality of print settings that the multi-function devices 10, 50 and the like are able to use. For example, the capability information that is associated with the model name 'M10' of the multi-function device 10 is the same as the capability information C10 (e.g., six print settings) of FIG. 1. Also, for example, the capability information that is associated with the model name 'M50' of the multi-function device 50 indicates 36 print settings (3×3×4).

As shown in FIG. 6, the prohibition setting table 80 is a table in which a setting ID and a prohibition setting are associated with each other. The setting ID is the same as the setting ID of FIG. 3. The prohibition setting indicates a print setting that the multi-function devices 10, 50 and the like are prohibited from using. For example, when a teaching material of a lesson is printed on a print sheet of a small size (for example, a print sheet of a postcard size), usability thereof may not be good. From this standpoint, in the prohibition setting table 80, the setting ID 'ID2' allotted to the category 'Lesson' is associated with a size 'postcard.'

(Respective Processing Executed by Respective Devices 10, 60, 100)

Figure 8:
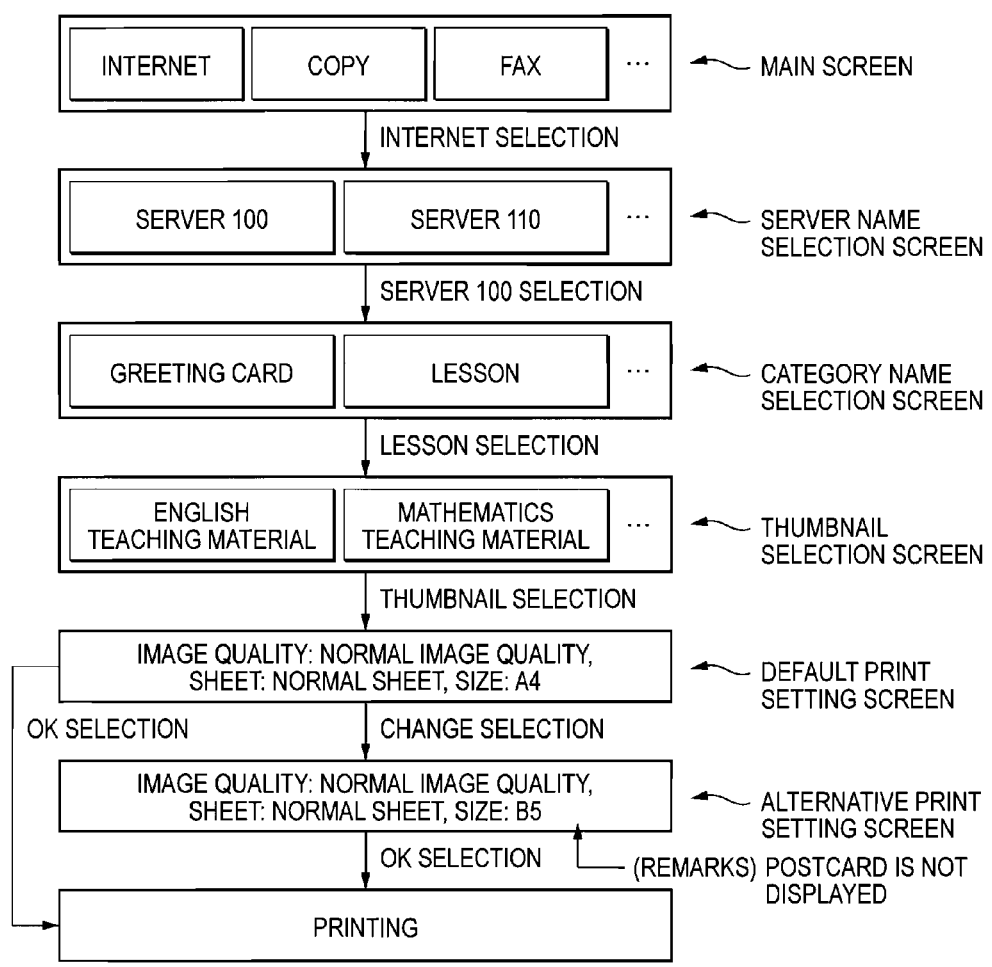
FIG. 8 shows transitions of respective screens that are displayed on a multi-function device.

The control unit 20 of the multi-function device 10 displays a main screen, which is stored in advance in the memory 24 of the multi-function device 10, on the display unit 14. As shown in FIG. 8, the main screen includes a plurality of character strings (for example, 'Internet', 'Copy', 'FAX' and the like) that are selected by a user. When the user wants to receive contents from the content server 100, the user selects the character string 'Internet' that is included in the main screen. In this case, as shown in FIG. 7, the control unit 20 of the multi-function device 10 transmits a request R2 to the relay server 60. The request R2 includes the model name 'M10' of the multi-function device 10.

The type name acquisition unit 96 of the relay server 60 receives the request R2 from the multi-function device 10 to thus acquire the model name 'M10' of the multi-function device 10. When the request R2 is received from the multi-function device 10, the display control unit 94 of the relay server 60 transmits a server name selection screen, which is stored in advance in the memory 74 of the relay server 60, to the multi-function device 10.

When the server name selection screen is received from the relay server 60, the control unit 20 of the multi-function device 10 displays the server name selection screen on the display unit 14. As shown in FIG. 8, the server name selection screen includes respective server names (for example, 'Server 100' and 'Server 110') of the plurality of content servers 100, 110. The user operates the operation unit 12 to thus select a server name of a content server, from which the multi-function device 10 is to receive the contents, from the server name selection screen. In this exemplary embodiment, a case where the user selects the server name 'Server 100' (e.g., the server name of the content server 100) will be described. As shown in FIG. 7, the control unit 20 of the multi-function device 10 transmits the server name 'Server 100' to the relay server 60.

When the server name 'Server 100' is received from the multi-function device 10, the control unit 70 of the relay server 60 transmits a request R4 to the content server 100.

When the request R4 is received from the relay server 60, the content server 100 transmits a category list to the relay server 60. The category list includes all category names that are included in the category table 104 (refer to FIG. 3) stored in the content server 100.

When the category list is received from the content server 100, the display control unit 94 of the relay server 60 records all the category names included in the category list into a category name selection screen template that is stored in advance in the memory 74 of the relay server 60. Thereby, a category name selection screen is generated. Then, the display control unit 94 transmits the category name selection screen to the multi-function device 10.

When the category name selection screen is received from the relay server 60, the control unit 20 of the multi-function device 10 displays the category name selection screen on the display unit 14. As shown in FIG. 8, the category name selection screen includes the category names such as 'Greeting card', 'Lesson' and the like. The user operates the operation unit 12 to thus select one category name from the category name selection screen. Incidentally, in the below descriptions, the category name that is here selected is referred to as 'category name CA.' As shown in FIG. 7, the control unit 20 of the multi-function device 10 transmits the category name CA to the relay server 60.

When the category name CA is received from the multi-function device 10, the control unit 70 of the relay server 60 transmits a request R6 to the content server 100. The request R6 includes the category name CA.

When the request R6 is received from the relay server 60, the content server 100 first refers to the category table 104 to thereby specify a setting ID (for example, 'ID2') associated with the category name included in the request R6. Then, the content server 100 specifies URLs (which are hereinafter referred to as 'M (M is an integer of 1 or larger) thumbnail URLs') of thumbnails of all contents belonging to a category that is indicated by the category name CA. Then, the content server 100 transmits the specified M thumbnail URL and the specified setting ID to the relay server 60.

The control unit 70 of the relay server 60 receives the setting ID from the content server 100, thereby acquiring the setting ID. When the M thumbnail URLs are received from the content server 100, the display control unit 94 of the relay server 60 transmits a thumbnail selection screen template stored in advance in the memory 74 of the relay server 60 and the M thumbnail URLs to the multi-function device 10.

When the thumbnail selection screen template and the M thumbnail URLs are received from the relay server 60, the control unit 20 of the multi-function device 10 transmits a request R8 to the content server 100 without via the relay server 60. The request R8 includes the M thumbnail URLs.

When the request R8 is received from the multi-function device 10, the content server 100 transmits the M thumbnails, which are stored at positions specified by the M thumbnail URLs included in the request R8, to the multi-function device 10 without via the relay server 60.

When the M thumbnails are received (e.g., downloaded) from the content server 100, the control unit 20 of the multi-function device 10 records the M thumbnails into the thumbnail selection screen template. Thereby, a thumbnail selection screen is generated. Then, the control unit 20 displays the thumbnail selection screen on the display unit 14. As shown in FIG. 8, the thumbnail selection screen includes M thumbnails. Incidentally, FIG. 8 shows an example where when the category name 'Lesson' is selected from the category name selection screen, thumbnails of contents such as English and mathematics teaching materials and the like are displayed. The user operates the operation unit 12 to thus select at least one thumbnail from the thumbnail selection screen. As shown in FIG. 7, when the thumbnail is selected by the user, the control unit 20 of the multi-function device 10 transmits a request R10 to the relay server 60.

(Determination Processing)

When the request R10 is received from the multi-function device 10, the determination unit 90 of the relay server 60 executes determination processing. In the determination processing, the determination unit 90 first determines a default print setting (e.g., recommendable print setting) by using the recommendation setting table 76 (refer to FIG. 4). As described above, the type name acquisition unit 96 receives the request R2 from the multi-function device 10 to thus acquire the model name 'M10' of the multi-function device 10. Also, the control unit 70 acquires the setting ID from the content server 100. The determination unit 90 specifies the print setting associated with the acquired model name 'M10' and the acquired setting ID from the recommendation setting able 76, thereby determining a default print setting. For example, when the acquired setting ID is 'ID2', the determination unit 90 determines the default print setting indicating 'normal image quality-normal sheet-A4.'

In the determination processing, the determination unit 90 also determines an alternative print setting that is different from the default print setting by using the capability table 78 and the prohibition setting table 80. The determination unit 90 first specifies the six print settings associated with the acquired model name 'M10' from the capability table 78. Then, the determination unit 90 specifies a prohibition setting associated with the acquired setting ID from the prohibition setting table 80. For example, when the acquired setting ID is 'ID2', the determination unit 90 specifies a prohibition setting indicating 'Postcard.' In this example, the determination unit 90 specifies the four print settings (high image quality-normal sheet-A4, high image quality-normal sheet-B5, normal image quality-normal sheet-A4 and normal image quality-normal sheet-B5) that are different from the default print setting and the specified prohibition setting from the six specified print settings, thereby determining four alternative print settings. In the below, an example where the four alternative print settings are determined will be described.

Subsequently, the display control unit 94 of the relay server 60 records the default print setting determined in the determination processing into a print selection screen template stored in advance in the memory 74 of the relay server 60. Thereby, a default print setting screen is generated. The display control unit 94 transmits the default print setting screen and alternative information indicating the four alternative print settings to the multi-function device 10.

As described above, in this exemplary embodiment, the relay server 60 stores therein the respective tables 76, 78, 80, and the relay server 60 executes the determination processing by using the respective tables 76, 78, 80 to thus determine the default print setting and the alternative print setting. Alternatively, if the respective tables 76, 78, 80 are stored in advance in the respective multi-function devices 10, 50, the respective multi-function devices 10, 50 can determine the default print setting and the alternative print setting. However, according to this configuration, the categories of the contents stored in the content server 100, for example, may be increased. Also, when an event that a multi-function device of a new model is sold occurs, the respective tables 76, 78, 80 of the respective multi-function devices 10, 50 are required be updated. Compared to this, according to this exemplary embodiment, even when the above events occur, it has only to update the respective tables 76, 78, 80 in the relay server 60 without changing the respective multi-function devices 10, 50. That is, according to this exemplary embodiment, it is possible to easily cope with the above events.

When the default print setting screen and the alternative information are received from the relay server 60, the control unit 20 of the multi-function device 10 first displays the default print setting screen on the display unit 14. As shown in FIG. 8, the default print setting screen indicates the default print setting 'normal image quality-normal sheet-A4.' In the multi-function device 10, the default print setting screen is first displayed, not a screen showing the other print settings. Thus, the user can know that it is preferable for the multi-function device 10 to print the contents belonging to the category 'Lesson' by using the default print setting. The user can operate the operation unit 12 to thus select a button (for example, OK button), which indicates that the default print setting will be used, with the default print setting screen being displayed (hereinafter, which is referred to as 'OK selection'). In this case, the contents are printed without displaying an alternative print setting screen (which will be described later).

On the other hand, the user can operate the operation unit 12 to thus select a button (for example, change button), which indicates that the print setting will be changed, with the default print setting screen being displayed (hereinafter, which is referred to as 'change selection'). In this case, the control unit 20 of the multi-function device 10 displays an alternative print setting screen, which indicates the alternative print setting included in the alternative information, on the display unit 14. As shown in FIG. 8, the alternative print setting screen indicates 'normal image quality-normal sheet-B5', for example. Incidentally, as described above, the alternative print setting is a print setting that is different from the prohibition setting (refer to FIG. 6). Hence, a size 'Postcard' is not displayed on the alternative print setting screen. That is, the user is unable to select the print setting including the size 'Postcard.' The user can execute the OK selection with the alternative print setting screen being displayed.

Incidentally, in a modified exemplary embodiment, the display control unit 94 of the relay server 60 may first display a print setting screen, which indicates the print setting used in a previous printing stored in the memory 24 of the multi-function device 10, on the display unit 14, not displaying the print setting screen indicating a recommendable print setting on the display unit 14 of the multi-function device 10. When the change selection is executed by the user, the display control unit 94 may display a print setting screen, which indicates a recommendable print setting, on the display unit 14. Also, in a modified exemplary embodiment, the display control unit 94 of the relay server 60 may first display a selection screen, which enables a user to select whether a print setting used in a previous printing or a recommendable print setting is displayed, on the display unit 14. The display control unit 94 may display a print setting screen, which indicates a print setting selected by the user, on the display unit 14.

When the user executes the OK selection, the control unit 20 of the multi-function device 10 transmits a request R12 to the relay server 60. The request R12 includes an image ID corresponding to the thumbnail selected by the user. Incidentally, in this exemplary embodiment, the image ID is included in the request R12. However, the image ID may be included in the request R10 that has been described above.

When the request R12 is received from the multi-function device 10, the control unit 70 of the relay server 60 transmits a request R14 to the content server 100. The request R14 includes an image ID that is the same as the image ID included in the request R12.

When the request R14 is received from the relay server 60, the content server 100 transmits a URL of the content (e.g., content corresponding to the thumbnail selected by the user) corresponding to the image ID included in the request R14 to the relay server 60.

When the content URL is received from the content server 100, the control unit 70 of the relay server 60 transmits the content URL to the multi-function device 10.

When the content URL is received from the relay server 60, the control unit 20 of the multi-function device 10 transmits a request R16 to the content server 100 without via the relay server 60. The request R16 includes the content URL.

When the request R16 is received from the multi-function device 10, the content server 100 transmits the content (for example, English teaching material), which is stored at the position specified by the content URL included in the request R16, to the multi-function device 10 without via the relay server 60.

When the content is received (e.g., downloaded) from the content server 100, the control unit 20 of the multi-function device 10 execute printing processing. That is, the control unit 20 enables the print execution unit 18 to print the content by using the print setting (default print setting or alternative print setting) selected by the user. Thereby, the user can acquire a print result in which the content is printed in accordance with the desired print setting.

Advantages of First Exemplary Embodiment

As described above, the contents belonging to the category 'Greeting card' are preferably printed with a relatively high image quality, and the contents belonging to the category 'Lesson' are not necessarily printed with a relatively high image quality. From this standpoint, when the category of the content to be printed is changed, it is preferable to change the recommendable print setting. Also, the highest print image quality is the 'high image quality' in the multi-function device 10 having the model name 'M10,' and the highest print image quality is the 'super high image quality' in the multi-function device 50 having the model name 'M50' (refer to FIG. 5). From this standpoint, when the model of the multi-function device to execute a printing is changed, it is preferable to change the recommendable print setting. Thus, in this exemplary embodiment, the appropriate print settings associated with the model names and setting IDs are described in the recommendation setting table 76. Hence, for example, when an instruction (the thumbnail selection of FIG. 7) for printing the content belonging to the category 'Greeting card' is input into the multi-function device 10, the relay server 60 can determine the default print setting (e.g., recommendable print setting) including the high image quality by using the recommendation setting table 76. Also, for example, when an instruction for printing the content belonging to the category 'Greeting card' is input into the multi-function device 50, the relay server 60 can determine the default print setting including the super high image quality by using the recommendation setting table 76. Then, the relay server 60 can display the default print setting screen indicating the default print setting on the display unit 14 of the multi-function device 10 (or multi-function device 50). As a result, the relay server 60 (e.g., print control unit 92) can enable the print execution unit 18 of the multi-function device 10 to print the content by using the default print setting.

Also, the relay server 60 transmits the alternative information indicating the alternative print setting to the multi-function device 10 together with the default print setting screen. Hence, the relay server 60 can provide the user with the alternative print setting. Specifically, the relay server 60 determines the alternative print setting that is different from the prohibition setting (for example, the size 'Postcard' associated with 'ID2') by referring to the prohibition setting table 80. Hence, the relay server 60 can provide the user with the appropriate alternative print setting.

Incidentally, the relay server 60 is an example of the 'control device' and the 'control server.' The multi-function devices 10, 50 are an example of the 'plurality of printers,' and the multi-function device 10 is an example of the 'specific printer.' The thumbnail selection and the change selection of FIG. 7 are examples of the 'first instruction' and the 'second instruction', respectively. The model name 'M10' and the setting ID 'ID2' are examples of the 'specific type relation information' and the 'specific content relation information', respectively. The default print setting that is determined in the determination processing is an example of the 'specific print setting relation information.' The capability information C10 is an example of the 'plurality of print settings that the specific printer is able to use.'

Second Exemplary Embodiment

In a second exemplary embodiment, the memory 74 of the relay server 60 stores therein the priority order table 82, instead of the recommendation setting table 76. As shown in FIG. 9, the priority order table 82 is a table in which a setting ID and a priority order are associated with each other. The setting ID is the same as the setting ID of FIG. 3. The priority order indicates a priority order of the print settings that the multi-function devices 10, 50 and the like are to use. For example, regarding the setting ID 'ID1', the priority order for the print image quality is set so that the priority order of a 'super high image quality' is the highest and the priority order of a 'normal image quality' is the lowest.

In the second exemplary embodiment, the contents of the determination processing are different from those of the first exemplary embodiment. Specifically, the determination unit 90 of the relay server 60 first specifies the capability information C10, which is associated with the acquired model name 'M10', from the capability table 78. Then, the determination unit 90 specifies the priority order associated with the acquired setting ID from the priority order table 82. Subsequently, the determination unit 90 specifies the print setting having the highest order of the specified priority orders from the six print settings included in the specified capability information C10, thereby determining the default print setting. For example, the capability information C10 includes 'high image quality' and 'normal image quality' regarding the print image quality. Hence, when the acquired setting ID is 'ID1', for example, the determination unit 90 specifies the 'high image quality' having the highest priority order of the 'high image quality' and 'normal image quality'. Likewise, the determination unit 90 selects 'normal sheet' and 'postcard.' Thereby, like the first exemplary embodiment, the determination unit 90 can determine the default print setting 'high image quality-normal sheet-postcard.' The other processing is the same as that of the first exemplary embodiment.

Advantages of Second Exemplary Embodiment

Also in the second exemplary embodiment, it is possible to realize the same effects as those of the first exemplary embodiment. Further, as can be seen from FIGS. 4 and 9, when the priority order table 82 is used, it is possible to reduce an amount of the information in the table, compared to the recommendation setting table 76. Thus, according to the second exemplary embodiment, it is possible to reduce the amount of the information that are to be stored in the memory 74 of the relay server 60.

Third Exemplary Embodiment

In a third exemplary embodiment, the priority order table is used, like the second exemplary embodiment. Also, the capability table 78 is not stored in the memory 74 of the relay server 60. Incidentally, the respective units 30 to 36 of the multi-function device 10 function, differently from the first and second exemplary embodiments. As shown in FIG. 10, the respective processing until the request R10 is transmitted from the multi-function device 10 to the relay server 60 is the same as that of FIG. 7.

When the request R10 is received from the multi-function device 10, the control unit 70 of the relay server 60 transmits the print setting screen template, the prohibition setting table 80, the priority order table 82 and the setting ID (e.g., the setting ID acquired from the content server 100), which are stored in advance in the memory 74 of the relay server 60, to the multi-function device 10, without executing the determination processing.

The table acquisition unit 36 of the multi-function device 10 receives the respective tables 80, 82 from the relay server 60, thereby acquiring the respective tables 80, 82. Then, the determination unit 30 of the multi-function device 10 executes the determination processing. In the determination processing, the determination unit 30 determines the default print setting by using the acquired priority order table 82, the capability information C10 (which is stored in advance in the memory 24 of the multi-function device 10) and the acquired setting ID. In the determination processing, the determination unit 30 also determines the alternative print setting by using the acquired prohibition setting table 80 and the capability information C10. The specific determination method is the same as that of the second exemplary embodiment.

Subsequently, the display control unit 34 of the multi-function device 10 records the default print setting determined in the determination processing into the print setting screen template acquired from the relay server 60. Thereby, the default print setting screen is generated. Subsequently, the display control unit 34 displays the default print setting screen on the display unit 14. Although not shown in FIG. 10, when the user executes the change selection, the display control unit 34 may display the alternative print setting screen, instead of the default print setting screen, like the first and second exemplary embodiments. Incidentally, the respective processing after the request R12 is transmitted from the multi-function device 10 to the relay server 60 is the same as that of FIG. 7. That is, when the user executes the OK selection with the default print setting screen being displayed, the print control unit 32 enables the print execution unit 18 to print the content by using the default print setting.

Advantages of Third Exemplary Embodiment

Also in the third exemplary embodiment, it is possible to realize the same effects as those of the second exemplary embodiment.

Further, in the third exemplary embodiment, since the relay server 60 does not have to execute the determination processing, it is possible to reduce the processing load of the relay server 60. Thus, the configuration of the third exemplary embodiment effectively functions in a system in which the number of the multi-function devices using the relay server 60 is enormous. Incidentally, in the third exemplary embodiment, the control unit 20 of the multi-function device 10 is an example of the 'control device.' The capability information C10 and the setting ID (for example, 'ID1') are examples of the 'specific type relation information' and the 'specific content relation information', respectively.

Fourth Exemplary Embodiment

As shown in FIG. 11, in a fourth exemplary embodiment, the content server 100 stores therein the contents belonging to the category 'Greeting card,' and the content server 110 stores therein the contents belonging to the category 'Lesson.' Also, in the fourth exemplary embodiment, the recommendation setting table 76 of FIG. 11 is used instead of the recommendation setting table 76 of FIG. 4. The recommendation setting table 76 of FIG. 11 is a table in which a model name, a server name and a setting content are associated with one another.

In the fourth exemplary embodiment, when the user selects a server name on a server name selection screen, the user does not have to select a category of contents. Therefore, it is possible to omit the communication of the request R4, the category list, the category name selection screen, the category name CA, the request R6, the setting ID and the like. Also, when the request R10 is received from the multi-function device 10, the determination unit 90 of the relay server 60 determines the default print setting by using the model name 'M10' acquired from the multi-function device 10, the server name 'Server 100 (or Server 110)' acquired from the multi-function device 10 and the recommendation setting table 76 of FIG. 11. The other processing is the same as that of the first exemplary embodiment.

Advantages of Fourth Exemplary Embodiment

In the first to third exemplary embodiments, the plurality of contents 102 is classified into two or more groups, based on the categories to which the contents 102 belong, respectively. On the other hand, in the fourth exemplary embodiment, the plurality of contents 102 is classified into two or more groups, based on the servers 100, 110 in which the contents 102 are stored, respectively. For example, when the content servers 100, 110 are not servers that are provided by the vendor of the multi-function devices 10, 50, it is difficult to enable the content servers 100, 110 to transmit the setting ID from the content servers 100, 110 to the relay server 60, which is executed in the first to third exemplary embodiments. Even in this situation, according to the fourth exemplary embodiment, the relay server 60 can appropriately determine the default print setting in accordance with the model name of the multi-function device 10 and the server name selected by the user, even though the relay server 60 does not have the setting ID. Incidentally, in the fourth exemplary embodiment, the server name of FIG. 11 is an example of the 'content relation information.' For example, in a case where the server name 'Server 100' of the content server 100 is selected in the multi-function device 10, the server name 'Server 100' is an example of the 'specific content relation information.'

Fifth Exemplary Embodiment

In a fifth exemplary embodiment, as shown in FIG. 12, the content table 106 stored in the content server 100 is a table in which a contents name and a setting ID are associated with each other. That is, in the fifth exemplary embodiment, the setting ID is allotted to each content, not each category.

Even when the request R6 (refer to FIG. 7) is received from the relay server 60, the content server 100 does not transmit the setting ID to the relay server 60. When the thumbnail selection is executed, the control unit 20 of the multi-function device 10 transmits the request R10 including the image ID to the relay server 60. When the request R10 is received from the multi-function device 10, the control unit 70 of the relay server 60 transmits the request including the image ID to the content server 100. In this case, the content server 100 specifies the setting ID, which is allotted to the content name of content associated with the corresponding image ID, from the content table 106, and transmits the corresponding setting ID to the relay server 60. As a result, the determination unit 90 of the relay server 60 can determine the default print setting from the recommendation setting table 76 of FIG. 4 in accordance with the model name 'M10' of the multi-function device 10 and the setting ID. The other processing is the same as that of the first exemplary embodiment.

Advantages of Fifth Exemplary Embodiment

As described above, according to the fifth exemplary embodiment, the setting ID is allotted to each content. Thus, it is possible to allot the appropriate print setting to each content in the recommendation setting table 76. As a result, the relay server 60 can determine the appropriate default print setting for each content selected by the user. Specifically, the configuration of the fifth exemplary embodiment effectively functions in a configuration where the appropriate print setting is changed for the plurality of contents belonging to the same category. Incidentally, in the fifth exemplary embodiment, the setting ID allotted to each content is an example of the 'content relation information.' For example, when the thumbnail of the content 'English teaching material' is selected with the multi-function device 10, the setting ID set for the content 'English teaching material' is an example of the 'specific content relation information.'

Incidentally, in the first to fifth exemplary embodiments, an HTTP Cookie is used so as to cope with a series of communications between the multi-function device 10 and the relay server 60. Specifically, two following methods are used. In a first method, when the request R2, which is first transmitted from the multi-function device 10 to the relay server 60, is received, the relay server 60 issues a Cookie including the model name 'M10' included in the request R2 and transmits the Cookie to the multi-function device 10. When the Cookie is received from the relay server 60, the multi-function device 10 transmits a request having the Cookie attached thereto in a next communication with the relay server 60. In a second method, when the request R2, which is first transmitted from the multi-function device 10 to the relay server 60, is received, the relay server 60 issues a Cookie including a random number (Session ID) and secures an area for storing the information (model name and the like) that is transmitted and received to and from the multi-function device 10. Further, the relay server 60 transmits the Cookie to the multi-function device 10. When the Cookie is received from the relay server 60, the multi-function device 10 transmits a request having the Cookie attached thereto in a next communication with the relay server 60. The relay server 60 reads and records the information as regards a storage area corresponding to the Session ID included in the Cookie. Like this, when the HTTP Cookie is used, it is possible to cope with a series of communications between the multi-function device 10 and the relay server 60. Therefore, even in a situation where the plurality of multi-function devices is connected to the relay server 60, the relay server 60 can appropriately perform communication with the purposed multi-function device.

Modifications to Exemplary Embodiments

Although the specific embodiments of the invention have been specifically described, the embodiments are just exemplary and do not limit the claims. The technology defined in the claims includes a variety of modification and changes to the above embodiments. For example, following modified exemplary embodiments are included.

First Modified Exemplary Embodiment

In the above-described exemplary embodiments, the print control units 32, 92 have the display control units 34, 94. The display control units 34, 94 display the default print setting screen on the display unit 14 of the multi-function device 10, so that the print control units 32, 92 enable the print execution unit 18 to print the contents by using the default print setting. Alternative to this configuration, the print control units 32, 92 may enable the print execution unit 18 to print the contents by using the default print setting without displaying the default print setting screen on the display unit 14. For example, in the first exemplary embodiment, the print control unit 92 of the relay server 60 may transmit the default print setting to the multi-function device 10 without transmitting the default print setting screen to the multi-function device 10. In this case, when the default print setting is received from the relay server 60, the control unit 20 of the multi-function device 10 may enable the print execution unit 18 to print the contents by using the default print setting without displaying the print setting screen. Generally, the print control unit may not have the display control unit and has only to enable the print execution unit to print the specific content by using the specific print setting.

Second Modified Exemplary Embodiment

In the above-described exemplary embodiments, the setting ID (refer to FIGS. 3 and 4) and server name (refer to FIG. 11) allotted to each category or the setting ID (refer to FIG. 12) allotted to each content is an example of the 'content relation information.' Instead of this, the 'content relation information' may be a category name or content name. Generally speaking, the 'content relation information' may be simply information relating to the content.

Third Modified Exemplary Embodiment

In the first exemplary embodiment, the model name 'M10' of the multi-function device 10 is transmitted from the multi-function device 10 to the relay server 60. Alternatively, a serial number, a MAC address and the like (e.g., inherent identification information allotted to each multi-function device) of the multi-function device 10 may be transmitted from the multi-function device 10 to the relay server 60. In this case, the memory 74 of the relay server 60 may pre-store therein a table for specifying the model name 'M10' of the multi-function device 10 from the serial number and the like of the multi-function device 10. In the determination processing, the determination unit 90 of the relay server 60 may specify the model name 'M10' of the multi-function device 10 from the serial number and the like of the multi-function device 10 and determine the default print setting by using the specified model name 'M10.' Generally, the control device may acquire the specific type relation information (for example, model name 'M10') from the specific printer, like the first exemplary embodiment, or may acquire the inherent identification information of the specific printer from the specific printer without acquiring the specific type relation information from the specific printer, like this modified exemplary embodiment.

Fourth Modified Exemplary Embodiment

In the second exemplary embodiment, for example, the capability table 78 (refer to FIG. 5) may not be stored in advance in the memory 74 of the relay server 60. In this case, for example, the capability information C10 of the multi-function device 10 may be transmitted from the multi-function device 10 to the relay server 60. The determination unit 90 of the relay server 60 may determine the default print setting by using the capability information C10 acquired from the multi-function device 10 and the priority order table 82. Further, the determination unit 90 of the relay server 60 may determine the alternative print setting by using the capability information C10 acquired from the multi-function device 10 and the prohibition setting table 80. Likewise, in the first exemplary embodiment, the capability information C10 of the multi-function device 10 may be transmitted from the multi-function device 10 to the relay server 60. The determination unit 90 of the relay server 60 may determine the alternative print setting by using the capability information C10 acquired from the multi-function device 10 and the prohibition setting table 80. Generally, the control device may store the plurality of print settings (for example, capability information C10) in advance that the specific printer is able to use, like the first and second exemplary embodiments, or may acquire the plurality of print settings, which the specific printer is able to use, from the specific printer, like this modified exemplary embodiment.

Fifth Modified Exemplary Embodiment

In the first exemplary embodiment, for example, the memory 74 of the relay server 60 may pre-store therein a table in which the model name, the setting ID and the prohibition setting are associated with one another, instead of the recommendation setting table 76. In this case, the determination unit 90 of the relay server 60 may determine the prohibition setting by using the model name 'M10' of the multi-function device 10, the setting ID and the corresponding table. In this case, the display control unit 94 of the relay server 60 may transmit the determined prohibition setting and the print setting screen template to the multi-function device 10. The control unit 20 of the multi-function device 10 may specify a default print setting, which is different from the prohibition setting acquired from the relay server 60, from the plurality of print settings included in the capability information C10 of the multi-function device 10, and record the specified default print setting into the print setting screen template, thereby generating the default print setting screen. Also in this modified exemplary embodiment, the display control unit 94 can enable the multi-function device 10 to display the default print setting screen. Generally, the 'specific print setting relation information' may be the specific print setting (e.g., recommendable print setting), like the above respective exemplary embodiments, or may be the prohibition setting, like this modified exemplary embodiment. That is, the 'specific print setting relation information' may be simply information relating to the specific print setting.

Sixth Modified Exemplary Embodiment

For example, the relay server 60 and the content server 100 may be configured as an integrated server. In this modified exemplary embodiment, the integrated server is an example of the 'control device.' Further, the memory 24 of the multi-function device 10 may store therein the respective tables 76 to 82 in advance. In this case, the determination unit 30 of the multi-function device 10 may determine the default print setting by using the respective tables 76 to 82. In this modified exemplary embodiment, the control unit 20 of the multi-function device 10 is an example of the 'control device.'

Seventh Modified Exemplary Embodiment

A table in which two or more tables of the respective tables 76 to 82 are combined may be used. For example, a table (e.g., a table in which the model name, the setting ID, the setting content and the capability information are associated with one another) in which the recommendation setting table 76 of FIG. 4 and the capability table 78 of FIG. 5 are combined may be used. Further, for example, a table (e.g., a table in which the model name, the setting ID, the setting content and the prohibition setting are associated with one another) in which the recommendation setting table 76 of FIG. 4 and the prohibition setting table 80 of FIG. 6 are combined may be used. Generally, the recommendation setting table (or priority order table), the capability table and the prohibition setting table may be separately configured tables, like the above-described exemplary embodiments, or may be an integrated table, like this modified exemplary embodiment.

Eighth Modified Exemplary Embodiment

In the above-described exemplary embodiments, the CPUs 22, 72 of the multi-function device 10 and the relay server 60 execute the processing in response to software, so that the functions of the respective units 30 to 36, 90 to 96 are implemented. Alternatively, at least a part of the respective units 30 to 36, 90 to 96 may be implemented by hardware such as logical circuit.

What is claimed is:

1. A system comprising:
a content server configured to store a plurality of contents;
a printer configured to download a content from the content server and print the downloaded content;
a control device;
wherein the control device further comprises:
an interface for communication with the content server and the printer;
a memory storing a server name selection screen, a category name selection screen, a setting table that contains a plurality of print settings, each of the plurality of print settings being associated with a printer name and a setting ID, the setting ID being unique to a category of the plurality of contents, each of the plurality of print settings being available for at least one of the plurality of printers; and
a processor configured to perform the following processes comprising:
receiving a first request from the printer, the first request indicating a printer name of the printer;
transmitting the server name selection screen stored in the memory to the specific printer;
in response to transmitting the server name selection screen to the specific printer, receiving a server name from the printer;
in response to receiving the server name, transmitting a second request to the content server, which has the received server name;
in response to transmitting the second request to the content server, receiving a category list from the content server;
updating the category name selection screen based on the received category list;
transmitting the category name selection screen to the printer;
in response to transmitting the category name selection screen to the printer, receiving a specific category name from the printer;
transmitting a third request to the content server, the third request including the specific category name received from the printer;
in response to transmitting the third request to the content server, receiving a setting ID and a plurality of locations, the setting ID corresponding to the specific category name, each of the plurality of locations corresponding to each of the plurality of contents with the specific category name stored in the content server;
transmitting the received plurality of locations to the printer;
in response to transmitting the received plurality of locations to the printer, receiving a fourth request from the printer;
in response to receiving the fourth request, determining a specific print setting based on the received setting ID and the printer name by referring to the setting table stored in the memory, the specific print setting being one of the plurality of print settings contained in the setting table and being available for the specific category and the specific printer; and
transmitting the specific print setting to the printer, and
wherein the printer is further configured to:
receive the specific print setting from the control device;
receive the specific content from the content server; and
print the received specific content in accordance with the specific print setting.

2. The system according to claim 1,
wherein the content server stores the plurality of contents classified into two or more categories,
wherein the category list indicates each of the two or more categories associated with the plurality of contents, and
wherein the setting ID is associated with one of the two or more categories.

3. The system according to claim 1,
wherein the content server comprises a first server and a second server,
wherein the first server stores the contents classified into a first category, and the second content server stores the content classified into a second category,
wherein the specific category name corresponds to the first category when the specific content is one of the contents stored in the first content server, and
wherein the specific category name corresponds to the second category name when the specific content is one of the contents stored in the second content server.

4. The system according to claim 1,
wherein the processor of the control device is further configured to:
determine an alternative print setting based on the specific category and the specific printer, the alternative print setting being different from the specific print setting and being one of the plurality of print settings contained in the setting table and
transmitting the alternative print setting with the specific print setting, and
wherein the printer is further configured to:
receive the alternate print setting with the specific print setting from the control device;
receive an instruction indicating the specific print setting is accepted by a user;
receive the specific content from the content server; and
print the received specific content in accordance with the specific print setting when the printer receives the instruction indicating the specific print setting is accepted.

5. The system according to claim 4,
wherein the printer is further configured to:
receive another instruction indicating the alternative print setting is accepted by a user;
print the received specific content in accordance with the alternate print setting when the printer receives the another instruction indicating the alternative print setting is accepted.

6. The system according to claim 4,
wherein the memory of the control device further stores a prohibition setting table, the prohibition setting table containing a prohibition setting associated with the category of the plurality of contents, and wherein the processor is configured to determine the alternative print setting that is different from a specific prohibition setting associated with the specific category in the prohibition setting table.

* * * * *